United States Patent [19]

Blumhardt et al.

[11] Patent Number: 5,629,978
[45] Date of Patent: May 13, 1997

[54] SERVICE DELIVERY USING BROADBAND

[75] Inventors: Mark S. Blumhardt, Niwot; Carleton A. Smith, Broomfield, both of Colo.

[73] Assignee: US WEST Technologies, Inc., Boulder, Colo.

[21] Appl. No.: 558,203

[22] Filed: Nov. 16, 1995

Related U.S. Application Data

[63] Continuation of Ser. No. 202,325, Feb. 28, 1994, abandoned.

[51] Int. Cl.[6] ............................................... H04M 3/42
[52] U.S. Cl. ........................... 379/201; 379/102; 379/110; 379/207; 348/7; 455/4.2; 455/6.3
[58] Field of Search ..................... 379/93, 96, 97, 379/98, 110, 102, 201, 207; 348/6, 7, 10, 12, 14; 455/4.1, 5.1, 6.3, 3.1, 4.2

[56] References Cited

U.S. PATENT DOCUMENTS

| | | | |
|---|---|---|---|
| 4,456,925 | 6/1984 | Skerlos et al. | 358/85 |
| 4,611,094 | 9/1986 | Asmuth et al. | 379/201 |
| 4,897,866 | 1/1990 | Majmundar et al. | 379/96 |
| 5,014,125 | 5/1991 | Pocock et al. | 379/105 |
| 5,050,164 | 9/1991 | Chao et al. | 359/135 |
| 5,142,532 | 8/1992 | Adams | 370/94 |
| 5,184,347 | 2/1993 | Farwell et al. | 370/94.1 |
| 5,189,673 | 2/1993 | Burton et al. | 370/110 |
| 5,192,999 | 3/1993 | Graczyk et al. | 358/85 |
| 5,239,532 | 8/1993 | Hensing et al. | 369/215 |
| 5,241,588 | 8/1993 | Babson, III et al. | 379/201 |
| 5,245,459 | 9/1993 | Faulkner et al. | 359/125 |
| 5,247,347 | 9/1993 | Litteral et al. | 379/105 |
| 5,303,229 | 4/1994 | Withers et al. | 370/58.1 |
| 5,381,459 | 1/1995 | Lappington | 348/10 |
| 5,396,546 | 3/1995 | Remillard | 379/96 |
| 5,410,343 | 4/1995 | Codington et al. | 348/7 |
| 5,414,773 | 5/1995 | Handelman | 379/96 |
| 5,436,957 | 7/1995 | McConnell | 379/207 |
| 5,473,679 | 12/1995 | La Porta et al. | 379/207 |
| 5,481,542 | 1/1996 | Logston et al. | 348/7 |
| 5,563,939 | 10/1996 | La Porta et al. | 379/201 |

FOREIGN PATENT DOCUMENTS

| | | | |
|---|---|---|---|
| 9307713 | 4/1993 | WIPO | 379/96 |

*Primary Examiner*—Krista M. Zele
*Assistant Examiner*—Scott Wolinsky
*Attorney, Agent, or Firm*—Brooks & Kushman P.C.

[57] ABSTRACT

A system and method for purchasing, customizing and modifying switch-based and Advanced Intelligent Network (AIN) telephone services through the Broadband Network. The system and method utilize a Graphical User Interface (GUI), a remote control and a Set Top Terminal (STT). The GUI is operative to access both Public Switched Telephone Network (PSTN) and non-PSTN telephone services. The remote control is similarly operative to navigate the GUI. Finally, the STT, which is provided in electrical communication with the GUI and the Broadband Network is provided for receiving downloaded video for display to the subscriber on the GUI and sending upstream signaling to the Broadband Network. The Graphical User Interface leads the telephone services subscriber through configuration options and permits the subscriber to easily purchase, customize and modify selected telephone services without direct interaction with service provider personnel.

13 Claims, 6 Drawing Sheets

SERVICE DELIVERY USING BROADBAND

This is a continuation of application Ser. No. 08/202,325, filed Feb. 28, 1994, now abandoned.

TECHNICAL FIELD

This invention relates generally to telephone service delivery. More particularly, this invention relates to a system and method for providing Public Switched Telephone Network (PSTN) service subscribers the capability to directly purchase and customize telephone services via the Broadband Network without direct interaction with PSTN service provider personnel.

BACKGROUND ART

The existing Public Switched Telephone Network (PSTN) includes service activation and control functionality to perform two basic tasks: (1) service delivery, i.e., the provision and modification of telephone services; and (2) service assurance, i.e., maintenance of the system. This service activation and control functionality takes the form of complex hardware and software which must be physically manipulated by human operators at remote stations, i.e., service and operations centers such as ESAC (Electronic Service Assistance Center), RCMAC (Recent Change Memory Administration Center), NOC (Network Operations Center), complex translations, business office, etc. These stations are operative to access systems, i.e. databases which are known and generally referred to by those skilled in the art as the "old legacy systems". These systems include, for example, CRIS (Customer Record Information System), SOPAD (Service Order Processing And Delivery), etc.

These numerous service and operations centers and their corresponding physical organizations of personnel, all communicate with one another to provide and modify telephone services for PSTN subscribers. A simple residential telephone service request thus requires input and interaction from dozens of employees at multiple locations resulting in a process which is excessively time-consuming, expensive, inefficient and highly prone to error.

Against this background, telephone service providers have long recognized that any marginal profit which might be realized from upgrading a residential subscriber's telephone service may, as a commercial reality, be vastly outweighed by the direct time and labor costs incurred in providing the requested service or change. Consequently, telephone service providers, and in particular, Advanced Intelligent Network (AIN) service providers, who have the technical capability to provide very powerful personalized telephone services, have heretofore been economically inhibited from providing such services to their subscribers. Instead, telephone service providers have been forced to offer only those services which can be mass-marketed, or otherwise economically justified.

It is understood that the above-noted economic obstacles to providing powerful personalized telephone services may be overcome through automation of the service activation and control functions. In such an automated system, the physical manipulation of these operations is shifted directly to the telephone subscriber. The complex web of physical organizations of persons and places which have conventionally performed the same functions are therefore substantially reduced, if not eliminated, along with their attendant costs.

The general solution to the above problem is thus simple in theory and as a result, has long been contemplated by PSTN designers. The practical implementation of that solution, however, has not been apparent. Until the present invention, the practical implementation has evaded PSTN designers. More particularly, in order to effectively shift the data manipulation functions to the telephone subscriber, an appropriate interface must be provided and properly configured to allow the subscriber to easily navigate the many powerful telephone services which are available, especially when deployed in Advanced Intelligent Networks.

Consider, for example, the approach taken in U.S. Pat. No. 4,611,094 (Asmuth et al) which teaches a method for defining an individual service for an individual subscriber. In that method, a telephone service is performed by a subscriber program resident on an external host computer which a subscriber defines using conventional programming sequences. As readily seen, while this method permits a new individual customer service to be configured without modifying the telephone network switching system software, the applicability of the method is severely limited. Most significantly, the method requires that every customer who uses the service have an individual host computer external to the telephone system. Still further, designing a service in accordance with the teachings of the '094 patent requires a computer programmer to write program sequences to define as well as modify the selected service.

Similarly, U.S. Pat. No. 5,241,588 (Babson, III et al.) teaches a system and process for providing programmable or customized customer telephone information services. Like Asmuth, however, Babson requires the use of an external personal computer (PC) having similar programming drawbacks.

Traditional Dual-Tone Multi-Frequency (DTMF) interfaces, which are typically found on Customer Premises Equipment (CPE), have also proven difficult and exceedingly time-consuming to use. Consider, for example, AIN services which, as referenced above, are highly powerful and might take extensive prompts by the user to navigate the required logic necessary to implement or modify even a basic telephone service. The traditional DTMF interface has thus proven unacceptable from a human factor standpoint, especially for time-of-day applications.

Consequently, a need has developed to provide a system and method for providing telephone service subscribers the capability to purchase, customize and modify telephone services. Such a system and method must incorporate a user-friendly interface which may be easily manipulated directly by PSTN service subscribers so as to reduce or eliminate the need for interaction with telephone service provider personnel.

DISCLOSURE OF THE INVENTION

It is thus a principal object of the present invention to provide a system and method for providing Public Switched Telephone Network (PSTN) service subscribers the capability to purchase, customize and modify telephone services without direct interaction with PSTN service provider personnel.

Yet another object of the present invention is the provision of a system and method for providing PSTN service subscribers the capability to directly purchase and customize both switch-based and Advanced Intelligent Network (AIN) services via the broadband network.

Still further it is an object of the present invention to provide such a system and method which incorporates a Graphical User interface (GUI).

In carrying out the above objects and other objects, features and advantages of the present invention, the system and method disclosed and claimed herein is directed for use in cooperation with a Public Switched Telephone Network (PSTN) having service activation and control functionality. The system and method are further directed specifically for use in providing PSTN service subscribers the capability to directly purchase, customize and modify telephone services via the broadband network. The present invention thus substantially reduces, if not eliminates, the complex web of physical organizations of service provider personnel which have heretofore been necessary to effect the system activation and control functionality found in conventional telephone networks.

The system and method further incorporates a Graphical User Interface (GUI) such as a television or the like which is operative to access the PSTN service activation and control functionality through a Set Top Box—called a Set Top Terminal (STT) by those skilled in the art. The Set Top Terminal is provided in electrical communication with the graphical user interface and the broadband network for receiving downloaded video for display to the subscriber and sending upstream signaling to the broadband network. A remote control is further provided to allow the subscriber to easily navigate the graphical user interface so as to select, effect, and modify desired telephone services.

In one form of the invention disclosed herein, the graphical user interface is a color television which has both full motion video and audio capability. The system and method are specifically adapted for use in purchasing and customizing switch-based services as well as purchasing, customizing and modifying Advanced Intelligent Network (AIN) telephone services. The invention thus includes a Service Switching Point (SSP) and an AIN Service Control Point (SCP). In accordance with the invention, the SCP is provided in electrical communication with the SSP and the PSTN service activation and control functionality. The SCP is operative to provide an AIN service template for each of the PSTN service subscribers. The telephone subscription includes multiple services and options which may be selected and enabled by subscribers via the broadband network.

In another form of the disclosed invention, a Service Node (SN) is provided in place of both the SSP and the AIN SCP. The Service Node, like the SSP and AIN SCP which it is designed to replace, is operative to provide an AIN service template to each of the PSTN service subscribers.

In operation, the method of the present invention provides telephone service subscribers including, but not limited to, PSTN service subscribers, the capability to purchase, customize and modify telephone services via the broadband network without direct interaction with telephone service provider personnel. The method comprises the provision of both a Graphical User Interface operative to access telephone services and a Set Top Terminal which is provided in electrical communication with both the GUI and the broadband network. By navigating the GUI with a remote control, the telephone service subscriber may select the desired telephone service sought to be purchased, customized or modified. In operation, video is downloaded from the broadband network on the STT for display to the telephone service subscriber on the GUI. Thereafter, control signals are generated at the STT for upstream receipt by the telephone service provider through the broadband network so as to effect the desired purchase, customization or modification of telephone services.

The attainment of the foregoing and related objects, advantages and features of the present invention should be more readily apparent to those skilled in the art after review of the following more detailed disclosure of the invention, taken together with the accompanying drawings, wherein:

BRIEF DESCRIPTION OF THE DRAWINGS

FIG. 2 is a schematic diagram of a conventional broadband network to which the system and method of the present invention are directed for use with;

BEST MODES FOR CARRYING OUT THE INVENTION

Figure 1:
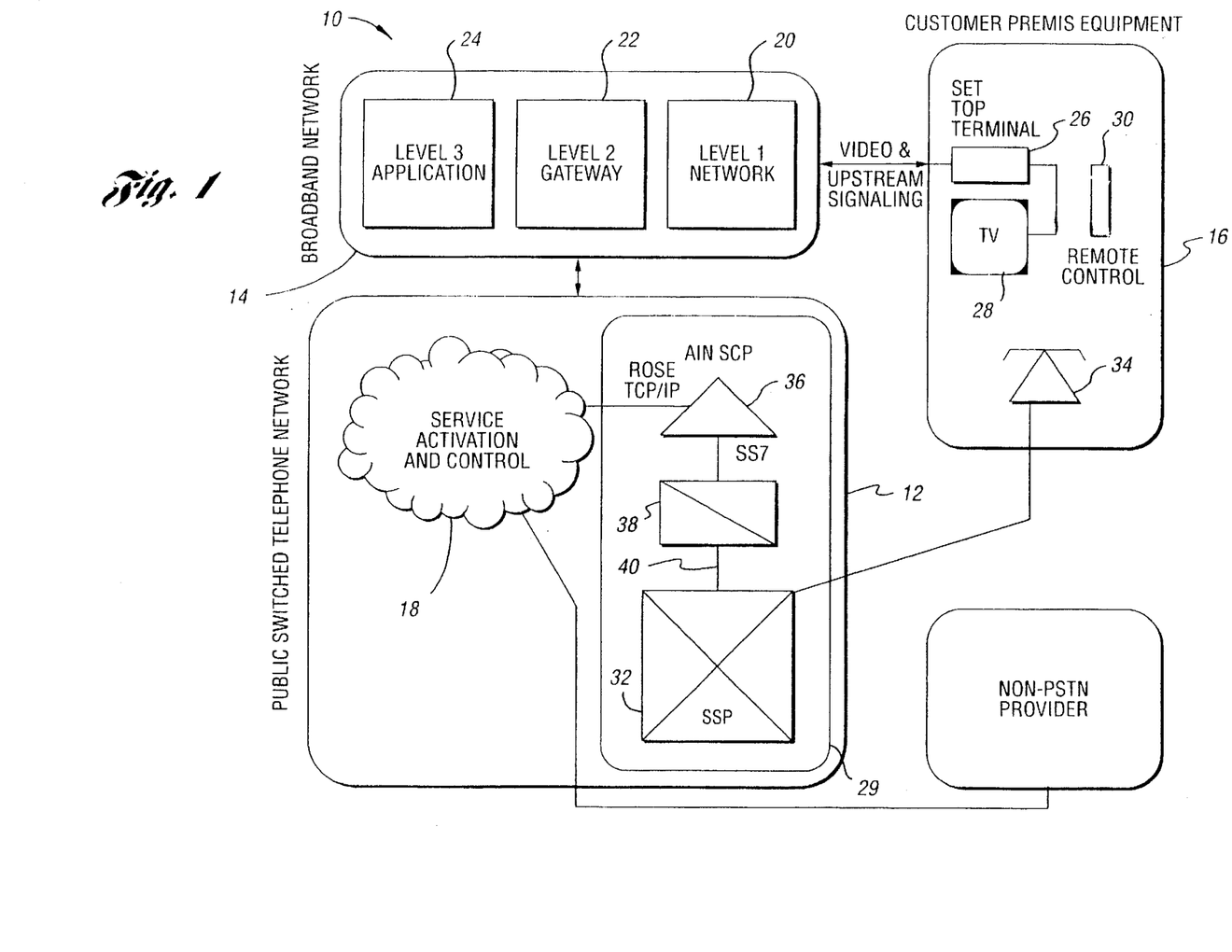
FIG. 1 is a generalized block diagram of the system of the present invention.

Turning now to the drawings, more particularly to FIG. 1, there is shown a schematic diagram of the system of the present invention designated generally by reference numeral 10. System 10 may be viewed as including three basic elements: the Public Switched Telephone Network (PSTN) designated generally by reference numeral 12, the Broadband Network referenced generally by reference numeral 14, and Customer Premises Equipment (CPE) designated generally by reference numeral 16.

Public Switched Telephone Network 12 is understood by those skilled in the art as comprising a Narrow Band network incorporating copper leads such as twisted pair setting up point-to-point connections for providing voice services. Public Switched Telephone Network 12 further includes service activation and control functionality 18 which, as referenced above, is operative to perform the basic tasks of service delivery, i.e., the provision and modification of telephone services; and service assurance, i.e. maintenance of the telephone system. This service activation and control functionality takes the form of complex hardware and software which, as also referenced above, must be physically manipulated by human operators at one or more of the old legacy systems, i.e., service and operations centers. Service activation and control functionality 18 is of a type conventionally employed by Public Switched Telephone Network service providers, and the novelty of the present invention resides in the particular system arrangement and marriage with the broadband network. The design and operation of service activation and control functionality 18 will therefore not be explained in further detail.

Still referring to FIG. 1 of the drawings, Public Switched Telephone Network 18 is shown directly interfaced with the Broadband network 14. Within the telephone industry, the term "broadband" denotes a very high digital line rate, such as the 156 megabits per second (Mb/s) optical line rate of new SONET OC3-Level fiberoptic systems. Broadband network 14 is of a conventional type and, as explained in further detail below, includes a Level one network 20, a Level two gateway 22 and a Level three application 24. The Broadband Network 14 is provided in electrical communication with CPE 16 and, more specifically, STT 26, which is connected to a Graphical User Interface (GUI) such as television 28. As shown, STT 26 is further provided in electrical communication with both GUI 28 and the Broadband Network 14 for receiving downloaded video for display to the telephone subscriber and sending upstream signaling to the broadband network 14. Also shown is a remote control 30 for navigating the user interface, i.e. television 28 which, in the preferred embodiment, is provided with full motion video and audio capability.

In one preferred embodiment, the present invention is adapted for use in purchasing, customizing and modifying both switch-based and Advanced Intelligent Network (AIN) telephone services. PSTN 12 may therefore include a Service Switching Point (SSP) 32 which is provided in electrical communication with the telephone service subscriber's telephone 34, as well as the service activation and control functionality 18. In AIN architecture, the Service Switching Points are known to those skilled in the art as generally nodes (usually the subscriber's local switch/central office switch) that recognize the "triggers" used when a subscriber invokes an intelligent network service and then communicates with the Service Control Point (SCP) 36 to operate the service. A Service Node (SN) 39 in electrical communication with PSTN Service Activation and Control functionality may be used to replace SSP 32 and AIN SCP 36. SN 39 is operative to provide an AIN service template for telephone subscribers to receive data therefrom via Broadband Network 14 to enable existing AIN services.

SCP 36, as shown in FIG. 1 is provided in electrical communication with SSP 32 through common channel Signaling System No. 7 (SS7) protocol and Service Transfer Point (STP) 38. Designed to be used primarily in high speed digital networks, common channel Signalling System No. 7 is capable of controlling low-speed analog facilities as well. SS7 generally operates at 64 KbPS and can support variable message links up to 2,176 bits (272 octets) of information per message. Service Transfer Points of the type shown and designated by reference numeral 38 are further known to those skilled in the art as packet switches used to generate signalling messages within the network. Service Transfer Point 38 is provided in electrical communication with SCP 36 and SSP 32 via signalling links 40. SCP 36 is further provided in electrical communication with PSTN service activation and control functionality 18 through signalling link 42 which may comprise ROSE TCP/IP or any other suitable signalling protocol.

In limited traffic situations, Service Switching and Control Points (SSCPs)(not shown) may also be provided for combining the functions of SCP 36 and SSP 32. Once again, because the novelty of the present invention lies in the unique system which interfaces with the customer premises equipment through the broadband network, neither the service activation and control functionality 18 nor the AIN components reference above, which are of conventional type, will be described in further detail.

Figure 2:
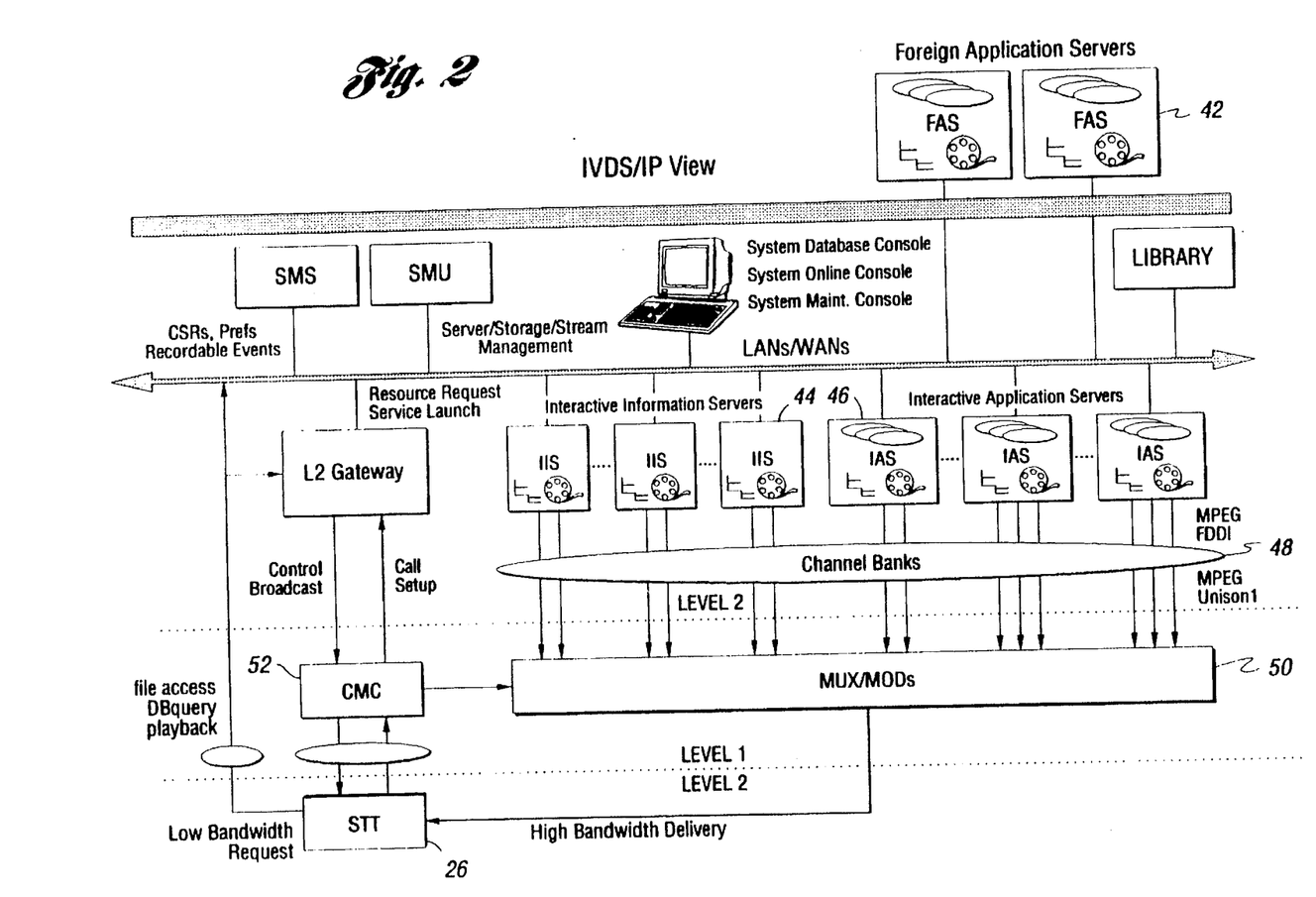

Turning now to FIG. 2 of the drawings, the interface between the public switch telephone network 12 and broadband network 14 will be described in further detail. As shown in FIG. 2 and referred to above, the broadband network is of a conventional type and is divided into three general Levels known to those skilled in the art: the Level 1 network; the Level 2 gateway; and the Level 3 video application. The Level 1 network is concerned primarily with the physical delivery of the video signals to the graphical user interface more particularly shown as television 28 in FIG. 1. The Level 1 network thus handles the upstream communication from STT 26.

Similarly, the Level 2 gateway, referred to generally by applicants as an Interactive Video Delivery System (IVDS), provides the interface for Level 3 applications (referred to by applicants as the Video Information Provider (VIP)) to access the broadband network 14. The Level 2 gateway handles many of the bookkeeping functions such as launching Level 3 video applications, setting up the physical connections between the Level 3 applications and the STT 26 and billing for use of the broadband network 14.

STT 26 is an integral part of the system of the present invention as its functionality spans all three broadband Levels. As known to those skilled in the art, hardware is provisioned in the STT to terminate broadband network signals. Software resident on the STT 26 also provides interfaces with the Level 2 gateway. In operation, video services are downloaded and executed on the STT 26. The STT is operative to access multi-media assets stored in the Level 2 gateway or the video application servers shown in FIG. 2 as Foreign Application Servers (FAS) 42, Interactive information Servers (IIS) 44 and Interactive Application Servers (IAS) 46.

In accordance with the invention, and as discussed in further detail below, an application running on the broadband network 14 will communicate with the Public Switched Telephone Network 12 using an appropriate interface and message flows. The specific lower layers of the protocol, X.25, TCP/IP, etc., are not crucial to the present invention provided that they meet anticipated and actual performance needs and support the required information. Likewise, PSTN 12 will communicate with non-PSTN service providers using an appropriate interface with information as also defined in further detail below. The specific lower layers of the protocol (X.25, TCP/IP, etc.), again however, are not important so long as they meet the performance needs and support the desired information of the system.

OPERATION

Referring still to FIG. 2 of the drawings, the operation of the generalized broadband network contemplated for use with the present invention will now be described. Consider, for example, a broadband subscriber who desires video on demand, i.e. a Level 3 video application. As those skilled in the art will recognize, this application is generally stored on a disk medium which is not amenable to direct broadcast over cable. In operation, the broadband network must, therefore, remove the information from the disk and then convert it to Radio Frequency (RF) signalling suitable for transmission.

The hardware that performs the above conversion is the Level 1 network. In order to complete the connection between the Level 3 video application and the Set Top Terminal 26, however, a connection must be established therebetween such that the STT 26 may tune into the required RF signalling. This connection is highly complicated and, in most cases, must be accomplished through the use of proprietary PSTN service provider technology. PSTN service providers have, therefore, developed what is known in the art as the Level 2 gateway. In order to perform the logical types of operations such as bookkeeping, etc., referenced above, the Level 2 gateway provides a set of API's (Automatic Program Interfaces) to the network. The Level 2 gateway thus operates as a buffer to the video applications, i.e., FAS 42, IIS 44 and IAS 46, etc.

In operation, data bits are streamed out in unison 1 format from the Level 3 application, i.e. FAS, IIS or IAS (42, 44 or 46) into 48 byte payload packages into channel banks 48. As discussed above, however, information still cannot proceed over the cable system because it is not in the required RF format. The information must, therefore, be multiplexed and then modulated so as to be converted to analog signalling, placed in the correct frequency range and input to the broadband network for travel to the Set Top Terminal 26. The multiplexing and modulating functions are performed by MUX/MOD 50 which takes the digital signals and converts the same to proper frequency in six megahertz increments. Each channel thus spans approximately six megahertz in bandwidth.

As shown in FIG. 2, Connection Managing Computer (CMC) 52 is responsible for hooking up a video server which has the stored assets desired by the subscriber to display on the STT 26 through channel banks 48 and MUX/MOD 50. In essence, CMC 52 is a switch which closes down the connection such that the digital data from the Level 3 data servers can weave their way through the network to the STT 26 to be displayed on the graphical user interface.

Once again, further detail regarding the design and operation of the broadband network is not necessary as it is well known to those skilled in the art. The novelty of the present invention lies in the system disclosed and its method of operation as it interfaces with the broadband network.

For purposes of the present invention, the capability to create and/or activate telephone services from the subscriber's television set 28 would appear as either a Level 1, 2 or 3 video application. This Level 1, 2 or 3 application would directly communicate with service activation and control functionality 18 within the Public Switched Telephone Network 12.

Providing the desired telephone service application as part of Level 1 or Level 2, ties the integration of the application to the conventional Broadband Network 14. It thus provides the appearance of integration between the local and broadband subscriber loop. As a Level 3 service, other telephone service providers and, in particular, AIN telephone service providers may compete with PSTN service providers on the network. This means that PSTN service providers could compete on other broadband networks for access to telephone service subscribers as well.

In keeping with the invention, the telephone service subscriber is presented with a user interface, preferably a graphical user interface as referenced above, which is operative to provide direct access to the telephone service creation/activation functionality 18. The subscriber navigates this interface by using their remote control 30. This service is downloaded into STT 26 and begins executing. The service is now free to take over television 28 and provide the subscriber with a multi-media presentation on the features available as well as take input from the subscriber to set up the features. Full motion video demonstrations, stills and CD quality audio can be presented to the subscriber to guide the subscriber through the application. Subscriber selections are sent upstream back to the PSTN. The service activation and control functionality 18 of the PSTN 12 then makes the appropriate changes for services in the PSTN, if appropriate, or passes the requests on to other telephone service providers.

The User Interface

"Service delivery" as the term is used in the present invention, is an end-to-end process where telephone services are activated for subscribers. In operation, PSTN service subscribers have the capability to create, configure and modify services and they are provided immediate access. For example, if a subscriber wishes to restrict their teenager from placing or receiving calls for the next week, the present invention permits the subscriber to create this capability on their television 28 and if desired, the functionality would run immediately.

As referenced above, the present invention is contemplated for use in providing PSTN service subscribers the capability to activate existing switch-based services, create AIN services and provision services provided by alternative non-PSTN service providers. It is further contemplated that these services will be presented seamless. That is, the PSTN service subscriber will not be able to discern between switch-based services and AIN services as the subscriber will be configuring their personalized telecommunications services regardless of type.

Figure 3:
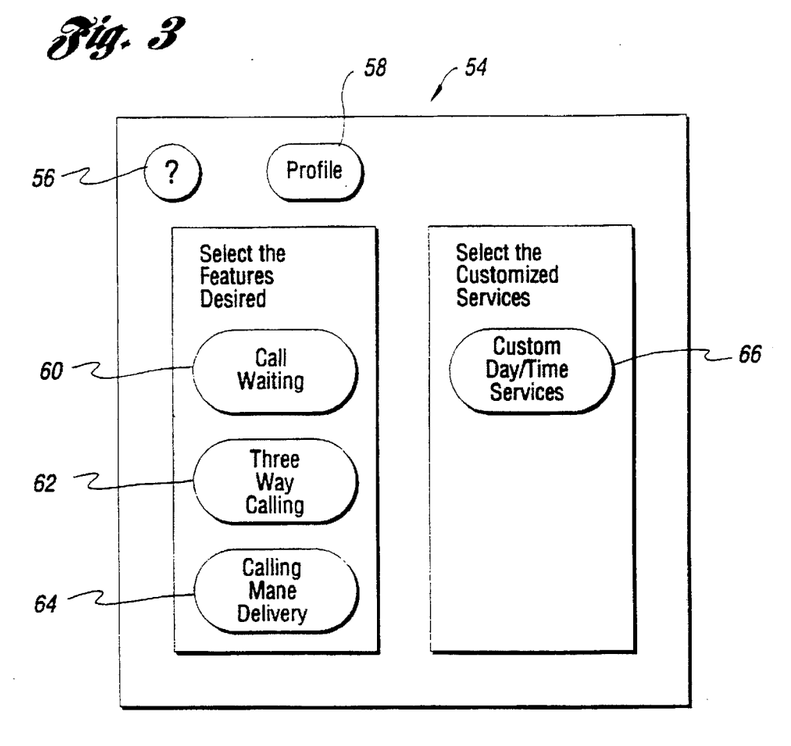
FIG. 3 is a schematic diagram of one form of a Graphical User Interface (GUI) screen contemplated by applicants for use with the present invention in purchasing and customizing switch-based telephone services.

When used to activate the switch-based services, the system and method of the present invention will permit PSTN service subscribers the ability to select and implement any existing feature which they desire. Examples are call waiting, calling name delivery, etc. In operation, the PSTN service subscriber will be able to specify whether they desire the feature permanently, or on a limited basis with an expiration date. FIG. 3, for example, is illustrative of one typical screen which might be provided on the Graphical User Interface, i.e., television 28, which might be used for service creation/activation in accordance with the present invention. There are, of course, many aspects that might impact the specific Graphical User Interface selected, such as human factors studies, television screen resolution capabilities, etc.

As shown in FIG. 3, the screen designated generally by reference numeral 54 is shown including numerous icons such as HELP icon 56, PROFILE icon 58 for prompting the telephone service subscriber to obtain an up-to-date report of her current telephone services and sample switch-based features which might be selected. Examples include, but of course, are not limited to, call-waiting 60, three-way calling 62, and calling name delivery 64, all of which may be found under a broad heading entitled "Select the Features Desired". It is further contemplated that an additional heading entitled "Select for Customized Services" will be provided bearing icons such as "Custom Day/Time Services" as represented by 66. Of course, a color television is preferred to more effectively delineate the choices for a telephone subscriber. Using a remote control such as that shown in FIG. 1 by reference numeral 30, the subscriber may navigate through screen 54 to select and implement the desired telephone services and/or changes.

As referenced above, the system and method of the present invention are further contemplated for use in implementing AIN services as well as switch-based services. In operation, subscribers would not actually create service logic on the AIN SCP 36. Rather, they would provide data to an existing service indicating a specific functionality desired. Telephone service subscribers would thus effectively be provided a blank AIN service template provisioned for their line. Only when the subscriber customizes portions of the service via the broadband network would functionality be provided. In addition to the above-referenced switch-based services, functionality would also provide time of day configurations for: Call Forwarding/Routing, Originating Call Screening (acceptance and rejection), Terminating Call Screening (acceptance and rejection), Customized Greetings, Long-Distance Carrier Selection, Do Not Disturb, Find Me (locating service), Teen Blocking, etc.

Figure 4:
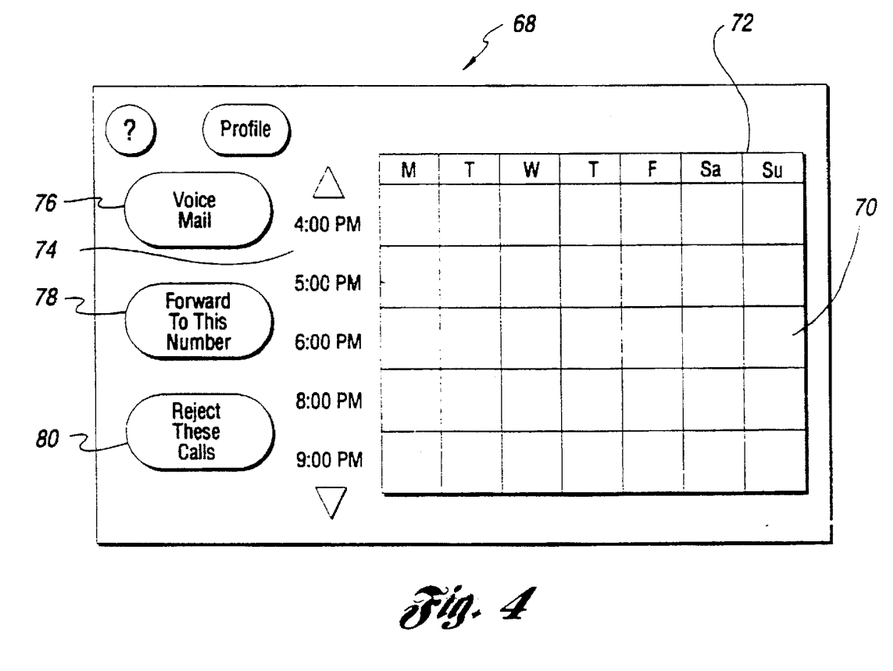
FIGS. 4–6 are schematic diagrams of yet another form of a Graphical User Interface (GUI) screen contemplated by applicants for use with the present invention in purchasing, customizing and modifying Advanced Intelligent Network (AIN) telephone services.
Figure 5:
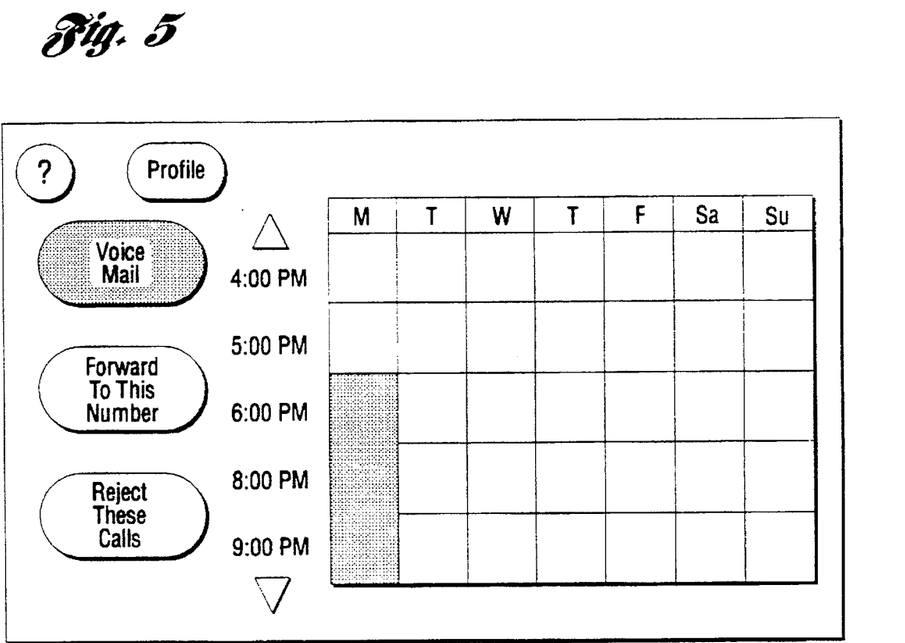
Figure 6:
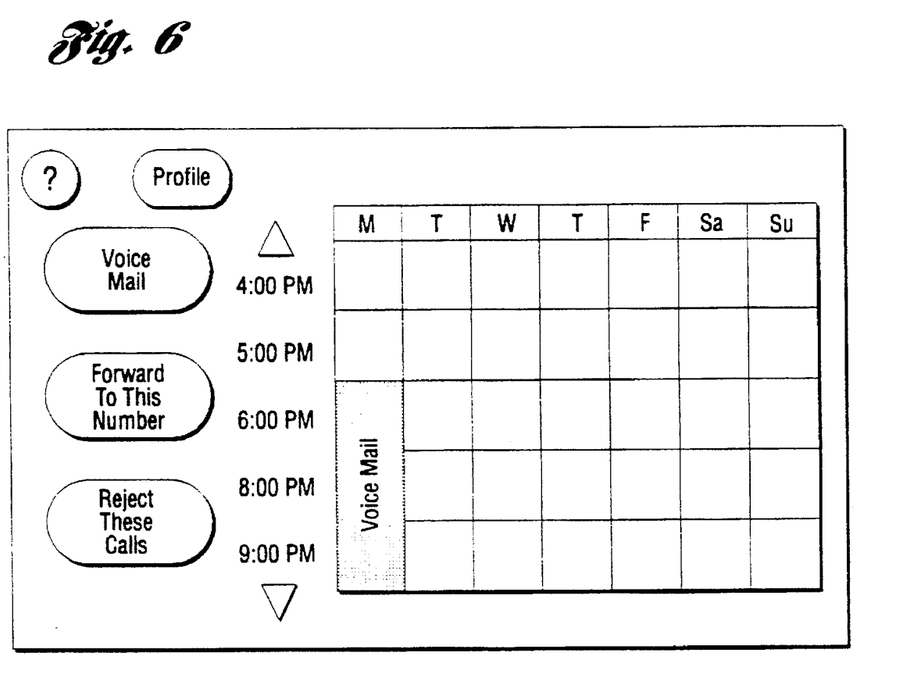

As shown in FIG. 4 of the drawings, a typical screen provided on television 28 is illustrated which might be used for service creation/activation in accordance with the teachings of the present invention. Again, there are many aspects that might impact the specific interface selected such as human factor studies, television screen resolution capabilities, etc. as reference above. As shown, calendar-based interface 68 displays a typical weekly calendar 70 delineated by day and time headings 72 and 74. This sample interface provides the subscriber flexibility to customize their telephone services as needed, providing capabilities such as teen screening, do not disturb, etc. as referenced above. The services are invoked based on time of day. For example, if the subscriber does not want to be interrupted during dinner hours (6:00–7:00 p.m.), and does not want their teenager to receive calls during specific homework hours (7:00–9:00 p.m.), calls may be restricted at that time and sent to voicemail as represented by icon 76. As shown in further detail in FIG. 5, through use of remote control 30, the subscriber may select time of day and select a voicemail feature. The resulting screen as shown in FIG. 6 would correspondingly indicate to the subscriber that voicemail has been selected on Mondays from 6:00–9:00 p.m.

Similarly, all calls placed to (976) and (900) numbers as well as any other undesirable number may be blocked. The subscriber could also select one long-distance carrier during business hours and another during off hours. Similarly, if the subscriber desired to receive telephone calls on a cellular telephone while away from her residence, calls could be forwarded accordingly. See, "forward to this number" icon 78 shown in FIG. 4. Yet still further, specific calls from selected calling parties such as the subscriber's teenager's friends, for example, could be rejected at specified hours through use of "reject these calls" icon 80.

All of the above functions can be accomplished through use of the graphical user interface 28 with added advantages audio and visual help facilities, advertisement of new additional functionality, etc.

As a practical implementation of the present invention, it is contemplated that a specific digital channel such as a "telephone lifestyles channel" may be designated by a subscriber's telephone service provider which may be tuned to through television 28 to obtain access to the broadband network 14 and, in particular, the service creation/activation functionality of the present invention. To entice telephone subscribers to tune to the desired channel, it is contemplated that infomercials may be offered on additional television channels which, in turn, may provide information to the user of the many benefits which might be obtained by personalizing their telephone services.

Service Delivery Interface

In keeping with the invention, it is understood that when subscribers are provided the power to create and activate a multitude of services, there may exist a problem of features interacting in undesirable ways. In addition, certain services may not be available in all possible combinations. Within the service delivery of the present invention, there is thus further contemplated the concept of service negotiation which handles this problem. In operation, service negotiation will not allow incompatible services to take place. It is assumed that the service provider will perform service negotiation for their networks. For example, for PSTN provided services, the service activation and control functionality 18 will perform this operation. Non-PSTN service providers must, of course, perform their own service negotiation.

In order to aid the process of service delivery and activation, it is contemplated that four messages will be defined: (1) profile request—broadband application requests subscriber's current services and profile (sent from broadband application to service provider); (2) profile request—result of query for subscriber's profile (sent from service provider to broadband application); (3) service update request—broadband requests service update (sent from broadband application to service provider); and (4) service update result—result of service update (sent from service provider to broadband application).

Figure 7:
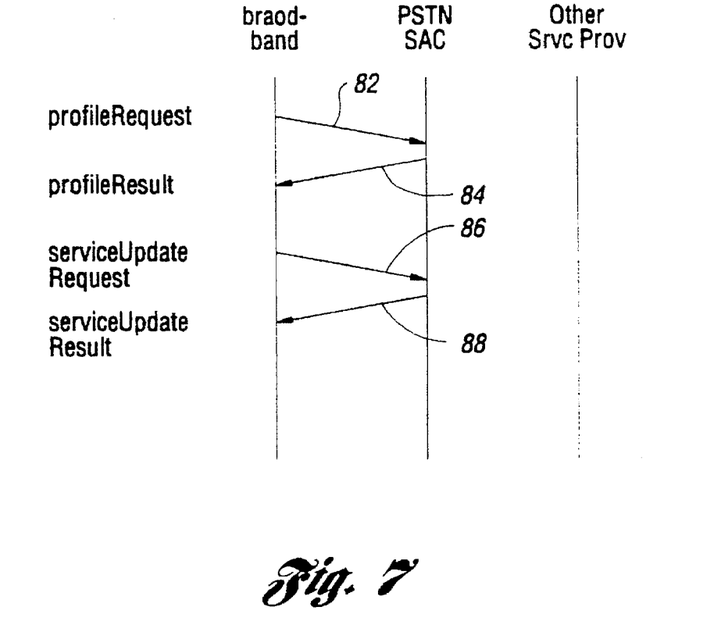
FIG. 7 is a schematic diagram of the contemplated exchange of messages between the broadband network and the Public Switched Telephone Network, where the PSTN is the service provider.

FIG. 7 illustrates the exchange of messages between the broadband network and the PSTN service provider in accordance with the teachings of the present invention. In operation, when the telephone service subscriber desires to modify or view their telephone services, the broadband application will request a complete download of data from the Public Switched Telephone Network 12 via a profile request message 82. The service activation and control portion 18 of the PSTN 12 will respond with a profile result message 84 and the broadband network 14 will then display the information to the user over television 28. When the subscriber wishes to activate any changes made to their telephone services, the broadband network 14 will send a service update request message 86 to the service activation control portion 18 of the PSTN 12. The data will then be loaded into the appropriate network elements and operations systems for service, and a service update result message 88 will be returned to the broadband application.

Figure 8:
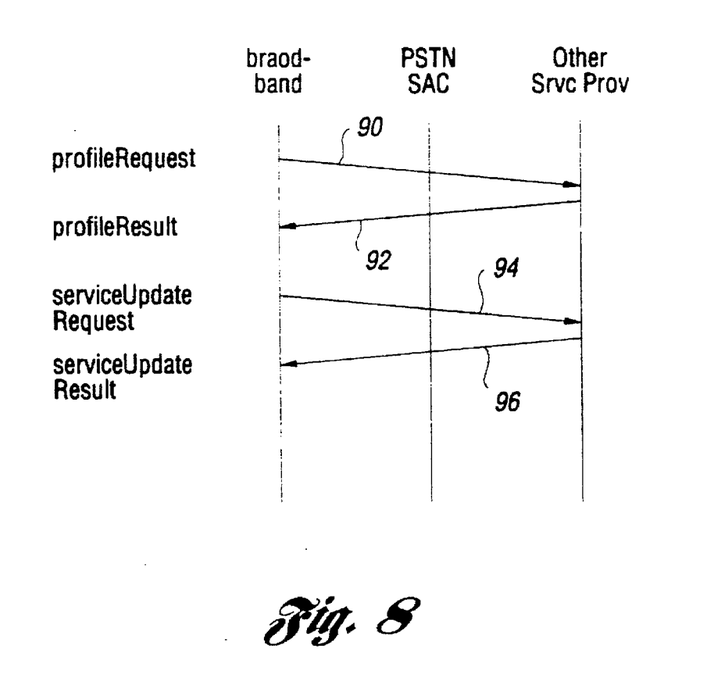
FIG. 8 is a schematic diagram of the contemplated exchange of messages between the broadband network and a non-PSTN service provider.

FIG. 8 similarly diagrams the exchange of messages between the broadband network 14 and non-PSTN service providers. The message flows are similar to that shown in FIG. 7 except that they flow directly between the broadband network 14 and the non-PSTN service provider. Thus, when the subscriber desires to modify or view their non-PSTN telephone services, the broadband application will request a download of data from the non-PSTN service provider via a profile request message 90. This service activation and control portion of the non-PSTN service provider (not shown) will then respond with a profile result message 92, and the broadband network 14 will then display the information to the user through a graphical user interface such as television 28 as shown in FIG. 1. When the subscriber wishes to activate any changes made to their non-PSTN telephone services, the broadband network will send a service update request message 94 directly to the non-PSTN service provider. Once received, the data will be loaded into the appropriate network elements and operations systems for service, and their service update result message 96 will be returned to the broadband application 14.

In accordance with the present invention, it is contemplated that the exchange of information between the Public Switched Telephone Network/non-PSTN service provider and the broadband network 14 will be data in a tag-length-value format. Shown below is an abstract syntax notation (ASN.1) representation of typical data which may be exchanged.

```
profileRequest              OPERATION
PARAMETER                   SEQUENCE{
                            subscriberID
                            }
subscriberID:: = [1]IMPLICITdigits
profileResult               OPERATION
PARAMETER                   SEQUENCE{
                            subscriberID,
                            -telephone number to provision, typically
                            -residential line, but could be any line.
                            switchBased         OPTIONAL,
                            AINBased            OPTIONAL,
                            otherProviderBased  OPTIONAL,
                            profile
                            }
switchBased: = [2] SEQUENCE of switchActivationRecord
switchActivationRecord SEQUENCE {
                            [1] activationDate     OPTIONAL,
                            [2] activationTime     OPTIONAL,
                            [3] deactivationDate   OPTIONAL,
                            [4] deactivationTime   OPTIONAL,
                            [5] switchFeature,
                            [6] switchFeatureData  OPTIONAL }
activationDate: = IMPLICIT OCTET STRING -- mm/dd/yy
activationTime: = IMPLICIT OCTET STRING -- hh:mm
deactivationDate: = IMPLICIT OCTET STRING -- mm/dd/yy
deactivationTime: = IMPLICIT OCTET STRING -- hh:mm
switchFeature: = [5]CHOICE {
                            [1] callwaiting,
                            [2] threeWayCall,
                            [3] CLASSCallingName Delivery
                            - all of the rest of the desired switch based
                            - services would be listed here
switchFeatureData: = IMPLICIT OCTET STRING
                            - e.g. fwd-to number for call fwd variable
AINBased: = [3]SEQUENCE OF AINActivationRecord
AINActivationRecord         SEQUENCE{
                            [1] activationDate     OPTIONAL,
                            [2] activationTime     OPTIONAL,
                            [3] deactivationDate   OPTIONAL,
                            [4] deactivationTime   OPTIONAL,
                            [5] dow                OPTIONAL,
                            [6] begtime            OPTIONAL,
                            [7] endtime            OPTIONAL,
                            [8] AINfeature
                            }
dow:: = [5]IMPLICIT ENUMERATED {
                            monday       (0),
                            tuesday      (1),
                            wednesday    (2),
                            thursday     (3),
                            friday       (4),
                            saturday     (5),
                            sunday       (6)
                            }
begTime:: = [6]IMPLICIT OCTET STRING -- hh:mm military. If none,
                            assume entire day.
endTime:: = [7]IMPLICIT OCTET STRING -- hh:mm military. If none,
                            assume all days.
AINfeature:: = [8] CHOICE {
                            [0] IMPLICIT forwardTo,
                            [1] IMPLICIT screenAccept,
                            [2] IMPLICIT screenReject,
                            [3] IMPLICIT voiceMail,
                            [4] IMPLICIT doNotDisturb
                            - all other AIN possibilities would be
                            included
                            }
digits:: = OCTET STRING
forwardTo:: = IMPLICIT digits
screenAccept:: = SEQUENCE OF digits
screenReject:: = SEQUENCE OF digits
voiceMail:: = BOOLEAN
doNotDisturb:: = SEQUENCE {
                            [1] IMPLICIT screenAccept OPTIONAL,
                            [2] IMPLICIT screenReject OPTIONAL,
                            [3] IMPLICIT voiceMail OPTIONAL,
                            }
profile:: = [3]SEQUENCE{
                            [1] IMPLICIT voiceMailDN OPTIONAL,
```

```
                              [2] IMPLICIT deactivate OPTIONAL,
                              }
voiceMailDN:: = IMPLICIT digits
deactivate:: = IMPLICIT BOOLEAN
otherProviderBased:: = IMPLICIT digits --   placeholder for the services that are
                                            created and activated by other
                                            providers
serviceUpdateRequest          OPERATION
PARAMETER                     SEQUENCE{
                              subscriberID,
                              - telephone number to provision, typically
                              - residential line, but could be any line.
                              /switchbased,
                              /AINBased,
                              otherProviderBased,
                              profile
                              }
serviceUpdateResult           OPERATION
PARAMETER                     SEQUENCE{
                              subscriberID,
                              - telephone number to provision, typically
                              - residential line, but could be any line.
                              result
                              }
result                        SEQUENCE{
                              resultCODE IMPLICIT digits - specific codes
                              - defined by service provider and broadband
                              - application
                              }
```

Figure 9:
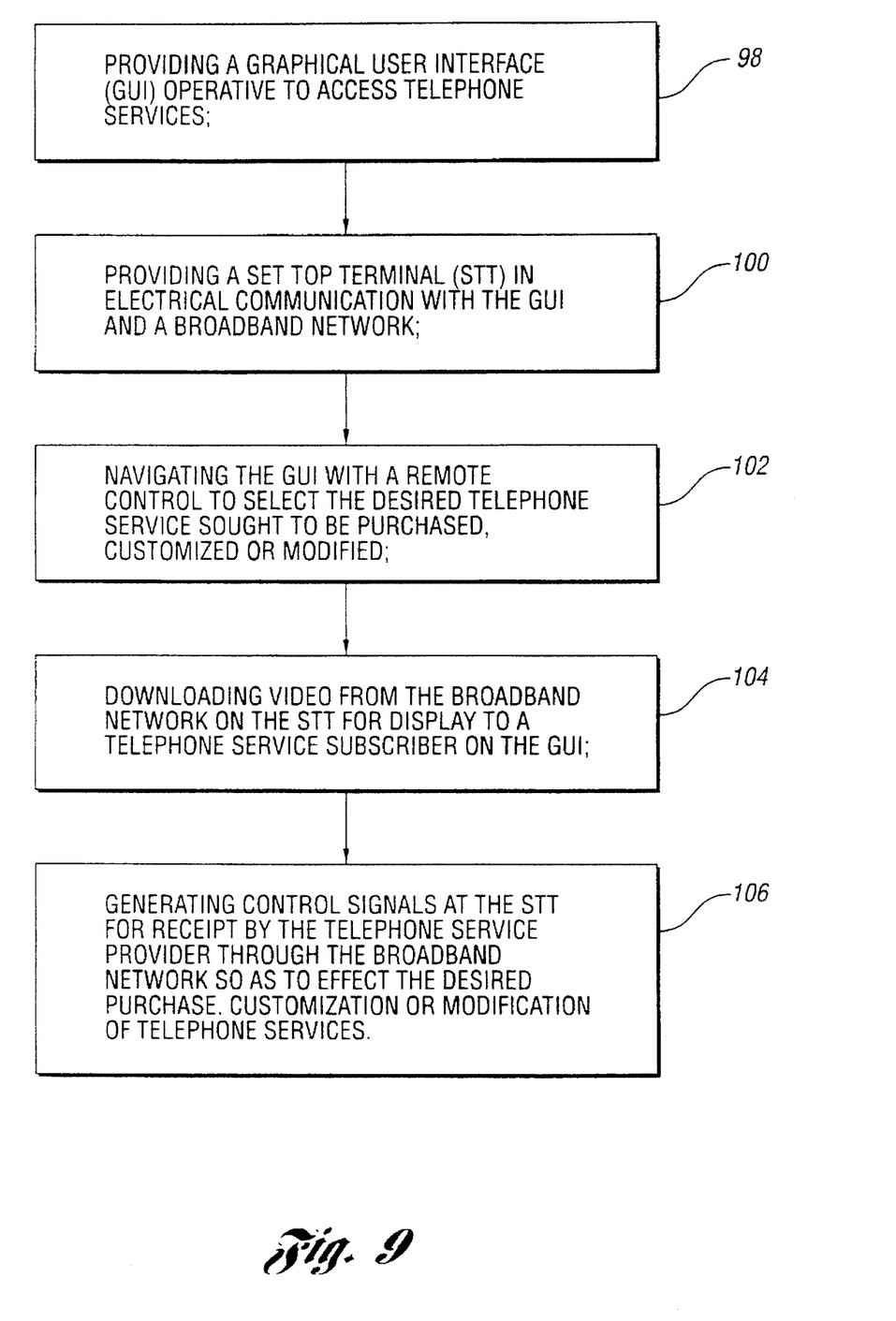
FIG. 9 is a block diagram of the method steps of the present invention.

Referring now to FIG. 9 of the drawings, a generalized block diagram is provided to more particularly identify the method steps of the present invention. As disclosed herein, the method is directed generally for use in providing telephone service subscribers the capability to purchase, customize and modify telephone services, particularly PSTN services, via the broadband network without direct interaction with telephone service provider personnel. The method thus includes the provision of a Graphical User Interface such as television 28 shown in FIG. 1 which is operative to access telephone services and, in particular, PSTN services as shown in block 98. The method further includes the provision of a Set Top Terminal 26, as shown in FIG. 1, which is provided in electrical communication with the GUI and the broadband network 14 as more particularly referenced in block 100. By navigating the GUI with the remote control 30, as shown in block 102, the telephone service subscriber may select a desired telephone service sought to be purchased, customized or modified. Once the desired service is identified, video may be downloaded from broadband network 14 on STT 26 for display to the telephone service subscriber on the GUI (television 28) as shown in further detail in block 104. Finally, control signals may be generated as shown in block 106 at the STT 26 for receipt by the telephone service provider through the broadband network 14 so as to effect the desired purchase, customization or modification of telephone services.

While the best modes for carrying out the invention have been described in detail, those familiar with the art to which this invention relates will recognize various alternative designs and embodiments for practicing the invention as defined by the following claims.

What is claimed is:

1. A system for providing a telephone service subscriber the interactive capability to activate or create telephone services without direct interaction with telephone service provider personnel, comprising:

a Public Switched Telephone Network (PSTN) having Service Activation and Control functionality including Service Negotiation;

a Set Top Terminal (STT) for receiving downloaded video and for sending upstream signaling;

a Broadband Network electrically coupled between the PSTN and the SST, the Broadband Network comprising a level 1 network for coordinating the delivery of video applications and for handling the upstream signaling from the STT, a level 2 gateway for providing an interface for video applications, and at least one level 3 video application;

a Graphical User Interface GUI) electrically coupled to the STT, said GUI operative to display the downloaded video to the telephone service subscriber and to access the Service Activation and Control functionality in the PSTN; and, a Control Unit for enabling the telephone service subscriber to navigate the GUI.

2. The system of claim 1, wherein the GUI is a television.

3. The system of claim 1, wherein the GUI has full motion video and audio capability.

4. The system of claim 1, further adapted for use in creating Advanced Intelligent Network (AIN) telephone services, comprising:

a Service Switching Point (SSP); and, an AIN Service Control Point (SCP) in electrical communication with the SSP and the PSTN Service Activation and Control functionality, the SCP operative to provide an AIN service template for the telephone subscriber to receive data therefrom via the Broadband Network so as to implement AIN services.

5. The system of claim 1, further adapted for use in creating Advanced Intelligent Network (AIN) telephone services, comprising:

a Service Node (SN) in electrical communication with the PSTN Service Activation and Control functionality, the SN operative to provide an AIN service template for the telephone subscriber to receive data therefrom via the Broadband Network so as to implement AIN services.

6. The system of claim 1, wherein the level 2 gateway is further adapted to launch video applications, set up the physical connections between the video applications and the STT, and bill for the use of the Broadband Network by the telephone subscriber.

7. The system of claim 1, wherein the STT is further adapted to access multi-media assets stored on the level 2 gateway or a video application server, and receive and execute downloaded video services.

8. The system of claim 1, wherein the Service Activation and Control functionality is operative to store service profiles for telephone subscribers and communicate with various data bases and systems in order to activate, deactivate, change or query data and services.

9. The system of claim 1, wherein the Service Activation and Control functionality is operative to provide and change telephone subscriber service profiles and pass through requests to non-PSTN service subscribers through the Broadband Network.

10. A method for providing a telephone service subscriber the interactive capability to activate or create telephone services without direct interaction with telephone service provider personnel, comprising the steps of:

providing a Public Switched Telephone Network (PSTN) having Service Activation and Control functionality including Service Negotiation;

providing a Set Top Terminal (STT) for receiving downloaded video and for sending upstream signaling;

providing a Broadband Network electrically coupled between the PSTN and the SST, the Broadband Network comprising a level 1 network for coordinating the delivery of video applications and for handling the upstream signaling from the STT, a level 2 gateway for providing an interface for video applications, and at least one level 3 video application;

providing a Graphical User Interface (GUI) electrically coupled to the STT, said GUI operative to display the downloaded video to the telephone service subscriber and to access the Service Activation and Control functionality in the PSTN;

navigating the GUI with a Control Unit to interactively select the desired telephone service sought to be activated or created;

downloading video from the Broadband Network on the STT for display to the telephone service subscriber on the GUI; and, generating control signals at the STT for receipt by the Service Activation and Control functionality in the PSTN via the Broadband Network so as to effect the desired activation or creation of telephone services.

11. The method of claim 10, wherein the GUI is a television.

12. The method of claim 10, further comprising the steps of:

generating a Profile Request message requesting a complete download of data from the PSTN;

generating at the Service Activation and Control functionality a Profile Result message responsive to the Profile Request message for display on the Television;

generating a Service Update Request message for receipt by the Service Activation and Control functionality; and, generating at the Service Activation and Control functionality a Service Update Result message responsive to the Service Update Request message for display on the Television.

13. The method of claim 10, wherein the GUI has full motion video and audio capability.

* * * * *